(12) United States Patent
Potekhina et al.

(10) Patent No.: US 9,727,914 B2
(45) Date of Patent: Aug. 8, 2017

(54) DIRECTED GRAPH-BASED STRATEGY TRADING TOOL

(71) Applicant: Trading Technologies International, Inc., Chicago, IL (US)

(72) Inventors: Tatiana Vasilyevna Potekhina, Park Ridge, IL (US); Brian Michael Schwartz, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 203 days.

(21) Appl. No.: 13/630,640

(22) Filed: Sep. 28, 2012

(65) Prior Publication Data
US 2014/0095365 A1     Apr. 3, 2014

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
CPC .............................. G06Q 40/04; G06Q 40/06
USPC ...................................................... 705/35–45
See application file for complete search history.

(56) References Cited

U.S. PATENT DOCUMENTS

| 8,185,467 | B2* | 5/2012 | Friesen et al. | 705/37 |
| 2007/0076002 | A1* | 4/2007 | Heaton | 345/440 |
| 2016/0048916 | A1* | 2/2016 | Glodjo | G06Q 20/10 |
| | | | | 705/37 |

* cited by examiner

*Primary Examiner* — Eric T Wong
(74) *Attorney, Agent, or Firm* — McDonnell Boehnen Hulbert & Berghoff LLP

(57) ABSTRACT

Certain embodiments provide systems, methods, and apparatus for directed graph-based strategy trading tools. In some embodiments, opportunities for altering a trading strategy position are visually represented by a tool as a directed graph. In some embodiments, a tool to facilitate trading strategy leg conversions is provided.

21 Claims, 9 Drawing Sheets

DIRECTED GRAPH-BASED STRATEGY TRADING TOOL

BACKGROUND

An electronic trading system generally includes a trading device in communication with an electronic exchange. The electronic exchange transmits market data to the trading device. Market data includes, for example, price data, market depth data, last traded quantity data, and/or any data related to a market for a tradeable object. In some electronic trading systems, the trading device sends trade orders to the electronic exchange. In some electronic trading systems, a server device, on behalf of the trading device, sends the trade orders to the electronic exchange. Upon receiving a trade order, the electronic exchange may enter the trade order into an exchange order book and attempt to match quantity of the trade order with quantity of one or more contra-side trade orders.

In addition to trading single items, a user may trade more than one item according to a trading strategy. One common trading strategy is a spread and trading according to a trading strategy may also be referred to as spread trading. Spread trading may attempt to capitalize on changes or movements in the relationships between the items in the trading strategy, for example.

BRIEF DESCRIPTION OF THE DRAWINGS

Certain embodiments are disclosed with reference to the following drawings.

Figure 1:
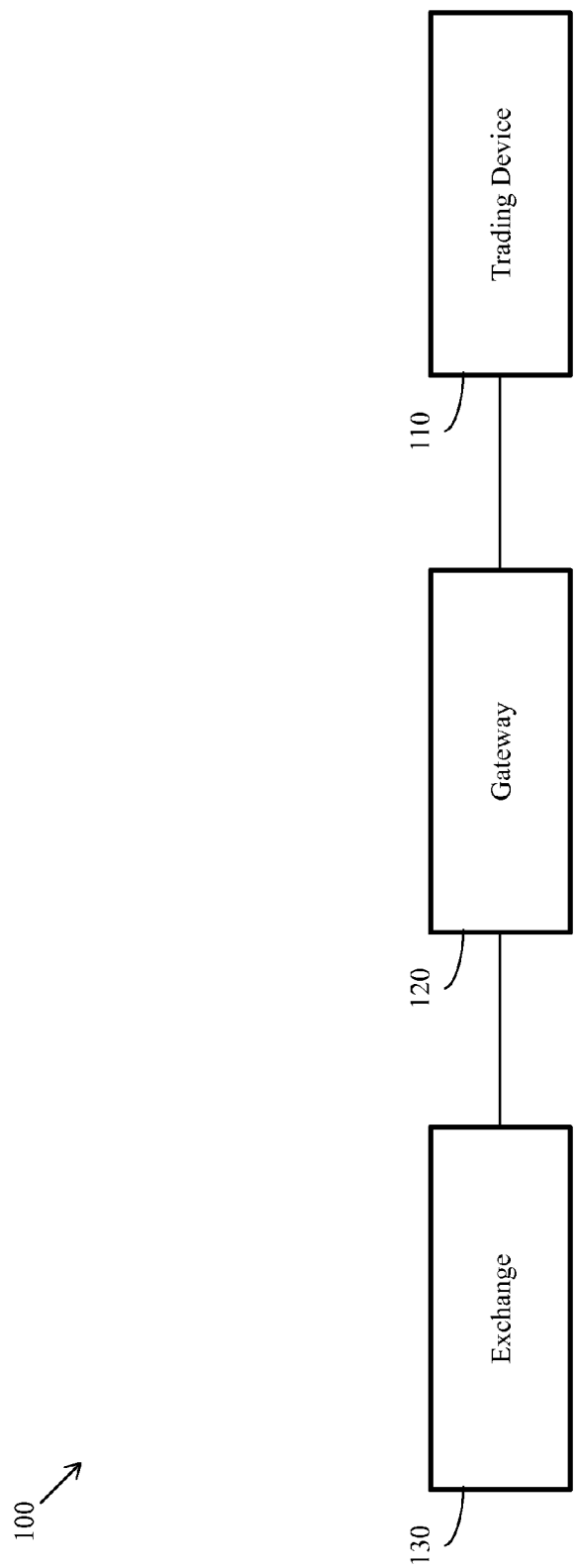
FIG. 1 illustrates a block diagram of an electronic trading system in which certain embodiments may be employed.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

I. Brief Description

The disclosed embodiments relate to directed graph-based strategy trading tools. In some embodiments, opportunities for altering a trading strategy position are visually represented by a tool as a directed graph. In some embodiments, a tool to facilitate trading strategy leg conversions is provided.

Although the following discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, the disclosed embodiments may be implemented in other ways.

Certain embodiments provide a method including determining by a computing device a current position in a plurality of tradeable objects, determining by the computing device a plurality of possible positions based on the current position and the plurality of tradeable objects, and displaying by a computing device in a graphical user interface a graph. Each possible position represents a position in one or more of the tradeable objects that is different from the current position. The graph includes a current position node. The current position node corresponds to the current position. The graph includes a plurality of possible position nodes. Each possible position node corresponds to one of the plurality of possible positions. The graph includes edges between the current position node and the possible position nodes. In certain embodiments, the method includes receiving by the computing device a command selecting an object in the graph, determining by the computing device a desired position associated with the selected object, and initiating by the computing device placement of at least one order to convert the current position to the desired position. The object is one of a node and an edge. In certain embodiments, the method includes updating by the computing device the displayed graph to reflect a new current position as a result of the at least one order.

Certain embodiments provide a computer readable medium having stored therein instructions executable by a processor, wherein the instructions are executable to determine a current position in a plurality of tradeable objects, determine a plurality of possible positions based on the current position and the plurality of tradeable objects, and display in a graphical user interface a graph, wherein the graph includes a current position node. Each possible position represents a position in one or more of the tradeable objects that is different from the current position. The current position node corresponds to the current position. The graph includes a plurality of possible position nodes. Each possible position node corresponds to one of the plurality of possible positions. The graph includes edges between the current position node and the possible position nodes. In certain embodiments, the computer readable medium includes instructions executable to receive a command selecting an object in the graph, determine a desired position associated with the selected object, and initiate placement of at least one order to convert the current position to the desired position. The object is one of a node and an edge. In certain embodiments, the computer readable medium includes instructions executable to update the displayed graph to reflect a new current position as a result of the at least one order.

Certain embodiments provide a system including a position analyzer, an interface manager, and an order manager. The position analyzer is configured to determining a current position in a plurality of tradeable objects. The position analyzer is configured to determine a plurality of possible positions based on the current position and the plurality of tradeable objects. The interface manager is configured to display in a graphical user interface a graph. The graph includes a current position node. The current position node corresponds to the current position. The graph includes a plurality of possible position nodes. Each possible position node corresponds to one of the plurality of possible positions. The graph includes edges between the current position node and the possible position nodes. In certain embodiments, the interface manager is configured to receive a command selecting an object in the graph and determine a desired position associated with the selected object. The order manager is configured to initiate placement of at least one order to convert the current position to the desired position. In certain embodiments, the interface manager updates the displayed graph to reflect a new current position as a result of the at least one order.

II. Example Electronic Trading System

FIG. 1 illustrates a block diagram of an electronic trading system 100 in which certain embodiments may be employed. The system 100 includes a trading device 110, a gateway 120, and an electronic exchange 130. The trading device 110 is in communication with the gateway 120. The gateway 120 is in communication with the exchange 130.

As used herein, the phrase "in communication with" may include in direct communication and indirect communication through one or more intermediary components.

In operation, the trading device 110 may send orders to buy or sell tradeable objects at the exchange 130. For example, a user may utilize the trading device 110 to send the orders. The orders are sent through the gateway 120 to the exchange 130. In addition, market data is sent from the exchange 130 through the gateway 120 to the trading device 110. The user may also utilize the trading device 110 to monitor this market data and/or base a decision to send an order for a tradeable object on the market data.

A tradeable object is anything which may be traded with a quantity and/or a price. For example, financial products, including stocks, options, bonds, futures, currency, warrants, funds derivatives, securities, commodities, swaps, interest rate products, index based products, traded events, goods, and collections and/or combinations of these, may be tradeable objects. A tradeable object may be "real" or "synthetic." A real tradeable object includes products that are listed and/or administered by an exchange. A synthetic tradeable object includes products that are defined by the user. For example, a synthetic tradeable object may include a combination of real (or other synthetic) products such as a synthetic spread created by a user utilizing a trading device 110. There may be a real tradeable object that corresponds and/or is similar to a synthetic trading object.

The trading device 110 may include one or more electronic computing platforms such as a hand-held device, laptop, desktop computer, workstation with a single or multi-core processor, server with multiple processors, and/or cluster of computers, for example. For example, while logically represented as a single device, trading device 110 may include a trading terminal in communication with a server, where collectively the trading terminal and the server are the trading device 110. The trading terminal may provide a trading screen to a user and may communicate commands to the server for further processing of the user's inputs through the trading screen, such as placing orders.

The trading device 110 is generally owned, operated, controlled, programmed by, configured by, or otherwise used by a user. As used herein, the phrase "user" may include, but is not limited to, a human (for example, a trader) or an electronic trading device (for example, an algorithmic trading system). One or more users may be involved in the ownership, operation, control, programming, configuration, or other use, for example.

The trading device 110 may include one or more trading applications. The trading application(s) may, for example, process market data by arranging and displaying the market data in trading and charting windows. The market data may be received from exchange 130, for example. As another example, the market data may be received from a simulation environment that provides historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the trading device 110. For example, certain components of a trading application may be executed on a trading workstation and other components of the trading application may be executed on a server in communication with the workstation.

The trading device 110 may include an electronic trading workstation, a portable trading device, an algorithmic trading system such as a "black box" or "grey box" system, an embedded trading system, and/or an automated trading tool, for example. For example, the trading device 110 may be a computing system running a copy of X_TRADER®, an electronic trading platform provided by Trading Technologies International, Inc. of Chicago, Ill. ("Trading Technologies"). As another example, the trading device 110 may be a computing device running an automated trading tool such as AUTOSPREADER® and/or AUTOTRADER™, also provided by Trading Technologies.

As another example, the trading device 110 may include a trading application which algorithmically processes market data and includes a user interface for manual placement of orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, an algorithm (also referred to as a trading algorithm) is specified by a definition which includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

Trading applications may be stored in a computer readable medium of the trading device 110. In certain embodiments, one or more components of a trading application may be stored on a trading workstation and other components of the trading application may be stored on a server in communication with the workstation. In certain embodiments, one or more components of a trading application may be loaded into the computer readable medium of the trading device 110 from another computer readable medium. For example, the trading application (or updates to the trading application) may be stored by a manufacturer, developer, or publisher on one or more CDs or DVDs, which are then provided to someone responsible for loading the application onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 ("pull distribution") and/or un-requested by the trading device 110 ("push distribution").

The trading device 110 is adapted to send orders for a tradeable object. The orders may be sent in one or more messages or data packets or through a shared memory system, for example. The trading device 110 may also be adapted to cancel orders, change orders, and/or query an exchange, for example. As another example, the trading device 110 may be adapted to send orders to a simulated exchange in a simulation environment that does not effectuate real-world trades.

The orders sent by the trading device 110 may be sent at the request of a user or automatically, for example. For example, a trader may utilize an electronic trading workstation to place an order for a particular tradeable object, manually providing one or more parameters for the order, such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 110 includes a user interface. The user interface may include one or more display devices for presenting a text-based and/or graphical interface of a trading application to a user, for example. For example, the display devices may include computer monitors, hand-held device displays, projectors, and/or televisions. The user interface may be used to specify or review parameters for an order using a trading application. The user interface may include one or more input devices for receiving input, for example. For example, the input devices may include a keyboard, trackball, two or three-button mouse, and/or touch screen. The user interface may include other devices for interacting with a user. For example, information may be audibly provided to a user through a speaker and/or received through a microphone.

In certain embodiments, a trading application includes one or more trading screens to enable a user to interact with one or more markets. Trading screens may enable users to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130, some or all of which, in turn, may be displayed with a user interface of trading device 110. Based on the received information, the trading screen may display a range of price levels and corresponding bid and ask quantities for the price levels in regard to tradeable objects. In order to provide the user with pertinent trading information, the trading screen may display a range of prices (and the corresponding bid and ask quantities) around the inside market. The information may be continuously or regularly provided to the trading application, which allows the trading application to update the trading screen with current market information. A user may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

In certain embodiments, the orders from the trading device 110 are sent to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 is adapted to communicate with the trading device 110 and the exchange 130. The gateway 120 facilitates communication between the trading device 110 and the exchange 130. For example, the gateway 120 may receive orders from the trading device 110 and transmit the orders to the exchange 130. As another example, the gateway 120 may receive market data from the exchange 130 and transmit the market data to the trading device 110.

In certain embodiments, the gateway 120 performs processing on data communicated between the trading device 110 and the exchange 130. For example, the gateway 120 may process an order received from the trading device 110 into a data format understood by the exchange 130. Similarly, the gateway 120 may transform market data in an exchange-specific format received from the exchange 130 into a format understood by the trading device 110. The processing of the gateway 120 may also include tracking orders from the trading device 110 and updating the status of the order based on fill confirmations received from the exchange 130, for example. As another example, the gateway 120 may coalesce market data from the exchange 130 and provide it to the trading device 110.

In certain embodiments, the gateway 120 provides services other than processing data communicated between the trading device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

In general, the exchange 130 may be owned, operated, controlled, or used by an exchange entity. Example exchange entities include the CME Group, the London International Financial Futures and Options Exchange ("LIFFE"), the IntercontinentalExchange ("ICE"), and Eurex. The exchange 130 may include an electronic matching system, such as a computer, server, or other computing device, that is adapted to allow tradeable objects, for example, offered for trading by the exchange, to be bought and sold. The electronic matching system may include a matching engine, for example. The exchange 130 may include separate entities, some which list and/or administer tradeable objects and others which receive and match orders, for example. The exchange 130 may include an electronic communication network ("ECN"), for example.

The exchange 130 is adapted to match orders to buy and sell tradeable objects. The tradeable objects may be listed for trading by the exchange 130. The orders may include orders received from the trading device 110, for example. Orders may be received from the trading device 110 through the gateway 120, for example. In addition, the orders may be received from other devices in communication with the exchange 130. That is, typically the exchange 130 will be in communication with a variety of other trading devices (which may be similar to trading device 110) that also provide orders to be matched.

The exchange 130 is adapted to provide market data. The market data may be provided in one or more messages or data packets or through a shared memory system, for example. The market data may be provided to the trading device 110, for example. The market data may be provided to the trading device 110 through the gateway 120, for example. The market data may include data that represents the inside market, for example. The inside market is the lowest sell price (also referred to as the "best ask") and the highest buy price (also referred to as the "best bid") at a particular point in time (since the inside market may vary over time). The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on both sides of the inside market. As another example, market depth may be provided for the first ten price levels at which quantity is available in the market. The market data may also include information such as the last traded price (LTP), the last traded quantity (LTQ), and order fill information.

In certain embodiments, the system 100 includes more than one trading device 110. For example, multiple trading devices similar to the trading device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the trading device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the trading device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more trading devices 110 to trade at more than one exchange (and/or provide redundant connections to multiple exchanges), for example.

In certain embodiments, the trading device 110 includes one or more computing devices or processing components. In other words, the functionality of the trading device 110 may be performed by more than one computing device. For example, one computing device may generate orders to be sent to the exchange 130 while another computing device may provide a graphical user interface to a user. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the trading device 110. For example, the components of the gateway 120 may be part of the same computing platform as the trading device 110. As another example, the functionality of the gateway 120 may be performed by components of the trading device 110. In certain embodiments, the gateway 120 is not present. Such an arrangement may occur when the trading device 110 does not need to utilize the gateway 120 to communicate with the exchange 130, for example. For example, if the trading device 110 has been adapted to communicate directly with the exchange 130.

In certain embodiments, the gateway 120 is physically located at the same site as the trading device 110. In certain embodiments, the gateway 120 is physically located at the same site as the exchange 130. In certain embodiments, the trading device 110 is physically located at the same site as the exchange 130. In certain embodiments, the gateway 120 is physically located at a site separate from both the trading device 110 and the exchange 130.

In certain embodiments, the system 100 may include other devices that are specific to the communications architecture such as middleware, firewalls, hubs, switches, routers, exchange-specific communication equipment, modems, security managers, and/or encryption/decryption devices.

III. Example Computing Device

Figure 2:
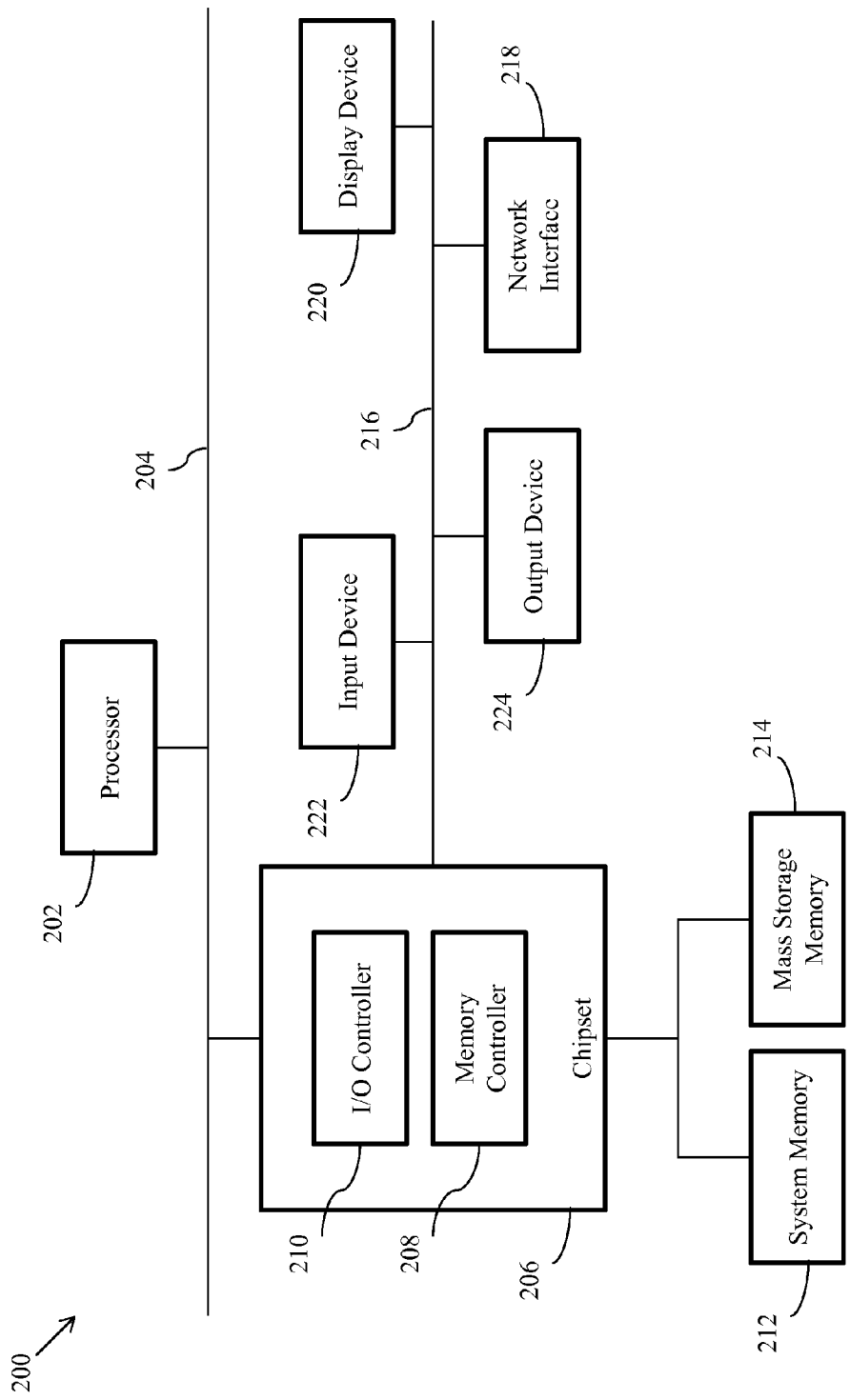
FIG. 2 illustrates a block diagram of an example computing device that may be used to implement the disclosed embodiments.

FIG. 2 illustrates a block diagram of an example computing device 200 that may be used to implement the disclosed embodiments. The trading device 110 of FIG. 1 may include one or more computing devices 200, for example. The gateway 120 of FIG. 1 may include one or more computing devices 200, for example. The exchange 130 of FIG. 1 may include one or more computing devices 200, for example.

The computing device 200 includes a processor 202, an interconnection bus 204, a chipset 206, a memory controller 208, an input/out (I/O) controller 210, a system memory 212, a mass storage memory 214, an I/O bus 216, a network interface 218, a display 220, an input device 222, and an output device 224. The computing device 200 may include additional, different, or fewer components. For example, multiple buses, multiple processors, multiple memory devices, multiple network interfaces, multiple display devices, multiple input devices, multiple output devices, or any combination thereof, may be provided. As another example, the computing device 200 may not include an output device 224 separate from the display device 220. As another example, the computing device 200 may not include a display device 220. As another example, the computing device 200 may not include an input device 222. Instead, for example, the computing device 200 may be controlled by an external or remote input device via the network interface 218.

The computing device 200 includes a processor 202 that is coupled to an interconnection bus 204. The interconnection bus 204 may include a communication bus, channel, network, circuit, switch, fabric, or other mechanism for communicating data between components in the computing device 200. The interconnection bus 204 may be communicatively coupled with and transfer data between any of the components of the computing device 200. For example, during an installation process of a trading application, one or more computer-readable instructions that are to be executed by the processor 202 may be transferred from the input device 222 and/or the network interface 218 to the system memory 212 and/or the mass storage memory 214. When the computing device 200 is running or preparing to run the trading application stored in the system memory 212 and/or the mass storage memory 214, the processor 202 may retrieve the instructions from the system memory 212 and/or the mass storage memory 214 via the interconnection bus 204.

The processor 202 may be a processor, processing unit, or microprocessor, for example. The processor 202 may include one or more general processors, digital signal processors, application specific integrated circuits, field programmable gate arrays, analog circuits, digital circuits, programmed processors, and/or combinations thereof, for example. The processor 202 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. The computing device 200 may be a multi-processor system and, thus, may include one or more additional processors that are communicatively coupled to the interconnection bus 204.

The processor 202 may be operable to execute logic encoded in one or more tangible media, such as the system memory 212, the mass storage memory 214, and/or via the network interface 218. As used herein, logic encoded in one or more tangible media includes instructions that are executable by the processor 202 or a different processor. The logic may be stored as part of software, hardware, integrated circuits, firmware, and/or micro-code, for example. The logic may be received from an external communication device via a communication network, for example, connected to the Internet. The processor 202 may execute the logic to perform the functions, acts, or tasks illustrated in the figures or described herein.

The processor 202 of FIG. 2 is coupled to the chipset 206, which includes the memory controller 208 and the I/O controller 210. A chipset typically provides I/O and memory management functions as well as a plurality of general purpose and/or special purpose registers and timers that are accessible or used by one or more processors coupled to the chipset 206. The memory controller 208 performs functions that enable the processor 202 (or processors if there are multiple processors) to access the system memory 212 and the mass storage memory 214.

The system memory 212 and the mass storage memory 214 may be one or more tangible media, such as computer readable storage media, for example. The system memory 212 may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, any other tangible data storage device, any combination thereof. The mass storage memory 214 may include various types of mass storage devices including, for example, a hard disk drive, optical media, magnetic tape, any other tangible data storage device, or any combination thereof. In certain embodiments, the system memory 212 and the mass storage memory 214 are non-transitory.

The system memory 212 and the mass storage memory 214 may be a single memory module, for example. The system memory 212 and the mass storage memory 214 may be adjacent to, part of, programmed with, networked with, and/or remote from processor 202, such that data stored in the system memory 212 and the mass storage memory 214 may be retrieved and processed by the processor 202, for example. The system memory 212 and the mass storage memory 214 may store instructions that are executable by the processor 202. The instructions may be executed to perform one or more of the acts or functions described herein or shown in the figures.

The I/O controller 210 performs functions that enable the processor 202 to communicate with the network interface 218, the display 220, the input device 222, and the output device 224 through an I/O bus 216. While the memory controller 208 and the I/O controller 210 are depicted in FIG. 2 as separate blocks within the chipset 206, the functions performed by these blocks may be integrated within a single semiconductor circuit or may be implemented using two or more separate integrated circuits. One or more of the components of the computing device 200 may be implemented as a system on a chip (for example, a system on a chip in an IPHONE™).

The network interface 218 may be a one-way or two-way communication coupling. Accordingly, the network interface 218 may communicatively connect one, two, or more communication networks or devices. For example, the interconnection bus 204 may be coupled with a gateway similar to gateway 120 of FIG. 1 discussed above via the network interface 218, such that one, some, or all of the components of the computing device 200 are accessible or may communicate with the gateway. As another example, the network interface 218 may couple the interconnection bus 204 with other communication networks. The network interface 218 may be, for example, an integrated services digital network (ISDN) card or a modem to provide a data communication connection. As another example, network interface 218 may be a local area network (LAN) card to provide a data communication connection to a compatible LAN, for example, connected to the Internet. Wireless links may also be implemented. The network interface 218 may send and receive electrical, electromagnetic, or optical signals that carry analog or digital data streams representing various type of information, for example.

The display device 220 may include a visual output device, cathode ray tube (CRT) display, electronic display, electronic paper, flat panel display, light-emitting diode (LED) display, electroluminescent display (ELD), plasma display panel (PDP), liquid crystal display (LCD), thin-film transistor display (TFT), organic light-emitting diode display (OLED), surface-conduction electron-emitter display (SED), laser television, carbon nanotubes, nanocrystal display, head-mounted display, projector, three-dimensional display, and/or transparent display device, for example.

The display device 220 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 220 and/or the input device 222 may be used to interact with the trading screen, for example.

The input device 222 may include a keyboard, mouse, microphone, touch-screen, trackball, keypad, joystick, and/or other device for providing input, for example. The input device 222 may be used, for example, to provide command selections to processor 202. For example, the input device 222 may be a mouse that is used to control a cursor displayed on a trading screen. The mouse may include one or more buttons for selection and control, for example.

The output device 224 may include a keyboard, mouse, speakers, touch-screen, trackball, keypad, haptic device or system, joystick, and/or other device for providing output, for example. For example, the output device 224 may be used to output one or more signals, such as a haptic signal or an audio signal, to a user. While the input device 222 and output device 224 are depicted in FIG. 2 as separate blocks, the functions performed by these blocks may be integrated into a single I/O device.

IV. Strategy Trading

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable objects in the trading strategy, for example.

An automated trading tool may be utilized to trade according to a trading strategy, for example. For example, the automated trading tool may be AUTOSPREADER® provided by Trading Technologies.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 3:
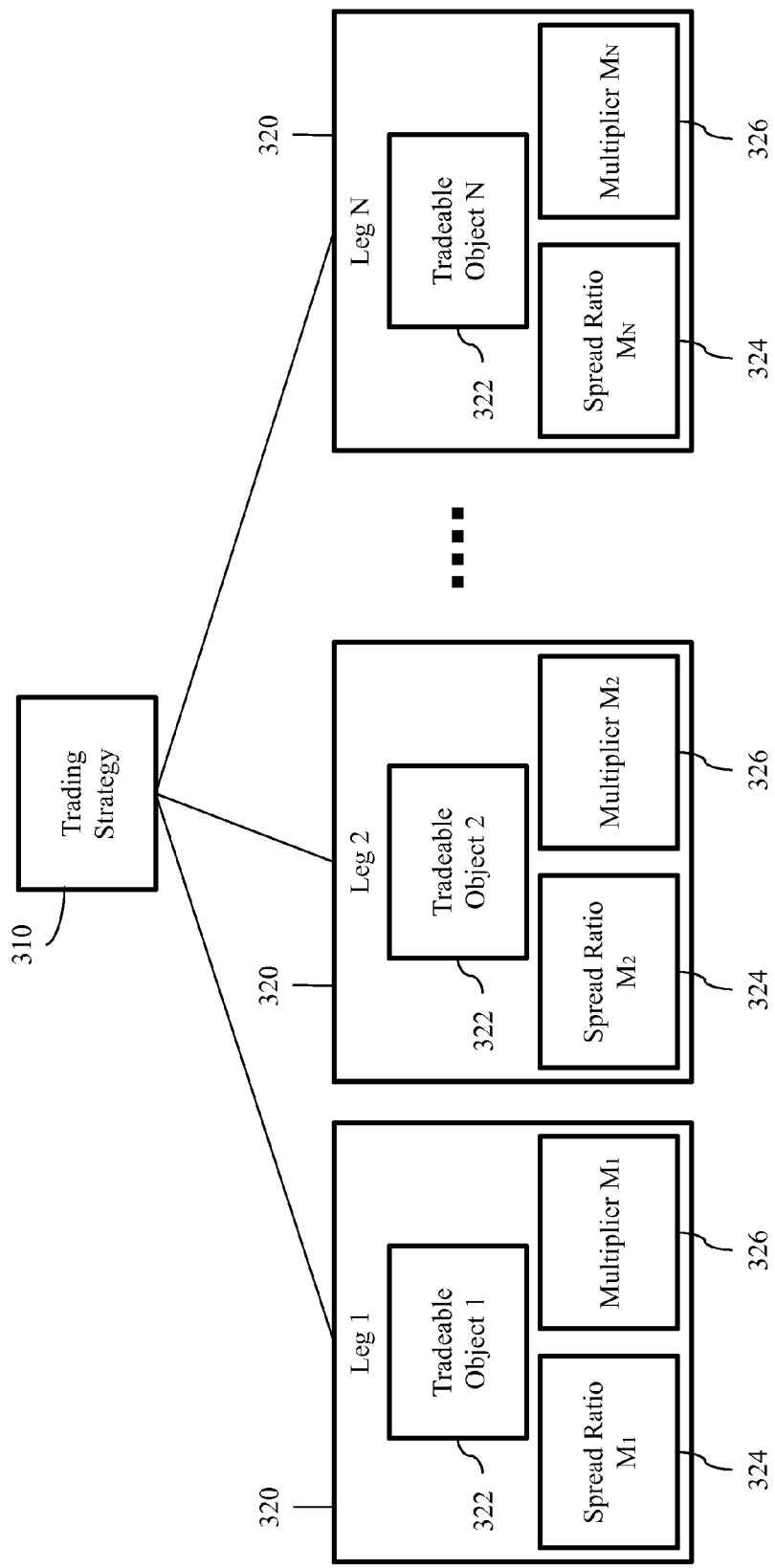
FIG. 3 illustrates a block diagram of a trading strategy which may be employed with certain embodiments.

FIG. 3 illustrates a block diagram of a trading strategy 310 which may be employed with certain embodiments. The trading strategy 310 includes "N" legs 320. The trading strategy 310 defines the relationship between the tradeable objects 322 for each of the legs 320 using the spread ratios 324 and multipliers 326 associated with each of the legs 320.

Once defined, the tradeable objects 322 in the trading strategy 310 may then be traded together according to the defined relationship. For example, assume that the trading strategy 310 is a spread with two legs 320. Leg 1 is for tradeable object A and Leg 2 is for tradeable object B. In addition, assume that the spread ratios 324 and multipliers 326 associated with Legs 1 and 2 are "1" and "−1," respectively. That is, the spread 310 is defined such that when the spread 310 is bought, 1 unit of tradeable object A is bought (positive spread ratio, same direction as the spread) and 1 unit of tradeable object B is sold (negative spread ratio, opposite direction of the spread). As mentioned above, typically in spread trading the opposite of the definition applies. That is, when the definition for the spread 310 is such that when the spread 310 is sold, 1 unit of tradeable object A is sold (positive spread ratio, same direction as the spread) and 1 unit of tradeable object B is bought (negative spread ratio, opposite direction of the spread).

The price for the trading strategy 310 is determined based on the definition. In particular, the price for the trading strategy 310 is typically the sum of price of the tradeable object 322 multiplied by the multiplier 326 for each of the legs 320 of the trading strategy 310. The price for a trading strategy may be affected by price tick rounding and/or pay-up ticks. However, both of these implementation details are beyond the scope of this discussion and are well-known in the art.

Recall that, as discussed above, a real spread may be listed at an exchange, such as exchange 130 and/or 230, as a tradeable product. In contrast, a synthetic spread may not be listed as a product at an exchange, but rather the various legs of the spread are tradeable at one or more exchanges. For the purposes of the following discussion, the trading strategy 310 is discussed as a synthetic trading strategy. However, similar techniques to those discussed below may also be applied by an exchange when a real trading strategy is being traded.

Continuing the example from above, if it is expected or believed that tradeable object A typically has a price 10 greater than tradeable object B, then it may be advantageous to buy the spread whenever the difference in price between tradeable objects A and B is less than 10 and sell the spread whenever the difference is greater than 10. As an example, assume that tradeable object A is at a price of 45 and tradeable object B is at a price of 40. The current spread price may then be determined to be (1)(45)+(−1)(40)=5, which is less than the typical spread of 10. Thus, a user may buy 1 unit of the spread, which results in buying 1 unit of tradeable object A at a price of 45 and selling 1 unit of tradeable object B at 40. At some later time, the typical price difference may be restored and the price of tradeable object A is 42 and the price of tradeable object B is 32. At this point, the price of the spread is now 10. If the user sells 1 unit of the spread to close out his position (that is, sells 1 unit of tradeable object A and buys 1 unit of tradeable object B), he has made a profit on the total transaction. In particular, while the user bought tradeable object A at a price of 45 and sold at 42, losing 3, the user sold tradeable object B at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread 310 to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 310 at a desired price, the automated trading tool may automatically place an order (also referred to as quoting an order) for one of the tradeable objects 322 of the trading strategy 310 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

V. Example Directed Graph-Based Strategy Trading Tool

Certain embodiments provide a directed graph-based strategy trading tool (also referred to herein as a "graph-based strategy trading tool"). The graph-based strategy trading tool represents positions in a set of one or more tradeable objects as nodes of a directed graph. A node may represent a current position or a possible position in the set of tradeable objects. Subsets of the tradeable objects may be part of one or more trading strategies. The graph-based strategy trading tool may be used to facilitate strategy trading via selection of nodes and/or edges in a displayed graph interface. The graph-based strategy trading tool may be provided in addition to, or in place of, a traditional trading interface on or in association with a trading device. It is noted that the various embodiments may be described with respect to a spread; however, it should be understood that the various embodiments may be used with other kinds of trading strategies as defined herein.

A directed graph may be defined as a graph whose edges have a direction. A directed graph may be referred to as a "digraph." An edge of a directed graph may be referred to as an "arc." When a directed graph is illustrated, an arrow may be depicted on an arc to indicate the direction, from one node to another node. A node of a directed graph may also be referred to as a "vertex."

The graph-based strategy trading tool represents available transitions between positions as edges of the directed graph. Thus, the graph-based strategy trading tool uses a directed graph where the edges represent a transition or conversion from one position to another position.

In certain embodiments, the graph-based strategy trading tool provides a user interface. The user interface displays a directed graph that a user may interact with. The directed graph includes a node representing a current position in a set of one or more tradeable objects. The directed graph also includes nodes representing possible positions in the set of tradeable objects, different from the current position. The directed graph also includes edges from the node representing the current position to the nodes representing positions into which the current position may be transitioned by executing a single trading strategy trade.

In certain embodiments, when a node representing a possible position is selected, the graph-based strategy trading tool facilitates one or more trades to achieve the selected possible position. In certain embodiments, when an edge is selected, the graph-based strategy trading tool facilitates one or more trades to achieve a possible position associated with the selected edge.

As an example, a trader may trade several different spreads that include common legs. For example, the trader may trade as a spread the FTSE against the IBEX-35, CAC, or AEX. Assume for this example that the trader has a position in the FTSE/IBEX-35 spread. Rather than completely liquidating the position first, the trader may want to convert the position in the FTSE/IBEX-35 spread into a position in the FTSE/CAC spread by keeping the FTSE position and exchanging the IBEX-35 position for the CAC. This may be referred to as converting the FTSE/IBEX-35 spread into the FTSE/CAC spread.

In certain embodiments, a current position of the trader in the set of tradeable objects is identified as a node in a directed graph. For example, the current position may be a node with a particular size, color, shape, style, formatting, or designation. As another example, the current position may be a primary or central node in the displayed directed graph. As another example, the current position may be a node located in a predetermined position in the displayed directed graph, such as a corner of the display. Potential positions in the set of tradeable objects are presented as other nodes in the directed graph. Each edge in the graph represents a course of action (for example, one or more trades) to take the trader from the current position to an alternate position in the set of tradeable objects.

In certain embodiments, a profit/loss ("P/L") for a position may be displayed via the graph. In certain embodiments, a P/L on a realized portion of a spread after a hypothetical conversion may also be displayed via the graph. For example, if a trader has a FTSE/IBEX-35 position, and the set of tradeable objects includes FTSE, IBEX-35, CAC, and AEX, the trader may convert that position to a FTSE/CAC, FTSE/AEX, IBEX-35/CAC, or IBEX-35/AEX position by swapping one leg for another available leg. The graph is presented to the trader so that the trader is made aware of their current position, one or more options for conversion, and an associated effect on their P/L at current market prices of each potential option. In certain embodiments, the graph presentation includes pricing associated with each strategy.

In certain embodiments, in addition to price and P/L information, the graph may include further information available for review to support trade decisions. For example, the graph may include one or more charts and/or associated analysis in support of trade decisions to be made with respect to the spread strategies made available to the trader via the graph interface. For example, one or more charts and/or decision support tools based on a trade execution stream and/or consolidated ticker stream (for example, X_STUDY® provided by Trading Technologies) may be provided to the trader in conjunction with one or more nodes on the spread graph.

Figure 4:
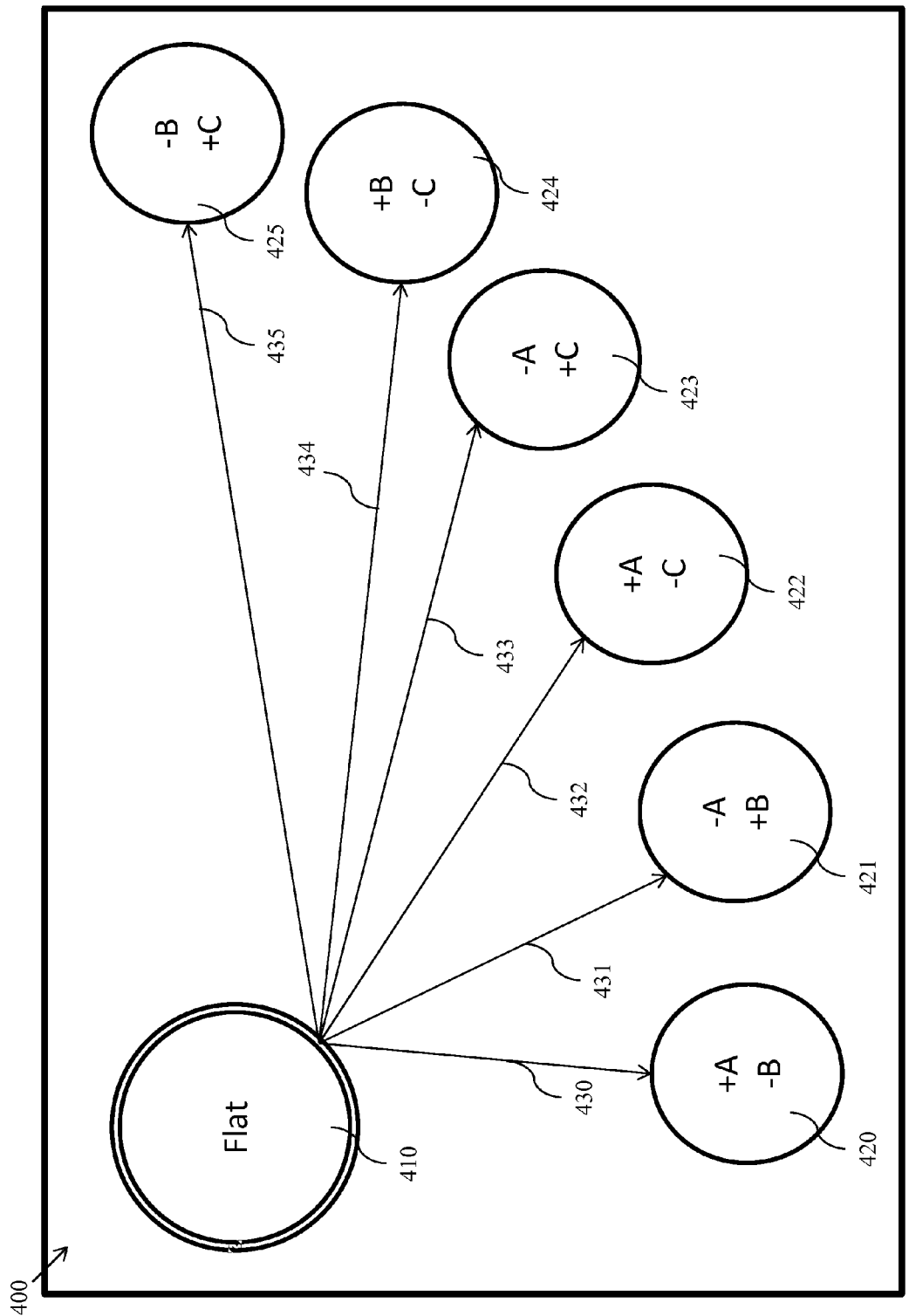
FIG. 4 illustrates an example user interface for a graph-based strategy trading tool according to certain embodiments.

FIG. 4 illustrates an example user interface 400 for a graph-based strategy trading tool according to certain embodiments. The set of tradeable objects in the example is A, B, and C. The user interface 400 is configured for trading three trading strategies: (1) the A-B spread, (2) the A-C spread, and (3) the B-C spread.

Different positions are represented in the user interface 400 by nodes 410 and 420-425. The trader's current position is indicated by node 410, which in this example shows a flat position (neither long nor short in any of the set of tradeable objects). In certain embodiments, the node corresponding to the current position (here, node 410) may be differentiated in one or more ways from other nodes in the user interface 400. For example, the current position node may be larger or smaller; a different color; a different shape; a different border style, font, or font size; a fixed location in the user interface; represented to be above or below other nodes through a three-dimensional effect; and/or expressly labeled as the current position. Possible positions are represented by nodes 420-425. As illustrated, the nodes 420-425 include labels for the possible position to which the nodes 420-425. For example, the label in node 420 indicates the possible position represented by node 420 is long the A-B spread (long A, short B). As another example, the label in node 425 indicates the possible position represented by node 425 is short the B-C spread (short B, long C).

Different actions to convert from the current position 410 to another possible position 420-425 are represented as edges 430-435 in the user interface 400. The edges 430-435 may be straight or curved lines, for example. As another example, the edges 430-435 may be dotted lines or of varying thickness. As illustrated, the edges 430-435 include arrows to indicate the direction of the conversion. In certain embodiments, arrows (or other indicators of direction) may not be included because the direction may be implicit based on the configuration of the graph. For example, a direction may clearly be from a current position node to a possible position node. In certain embodiments, an edge may not be shown to certain possible position nodes. For example, the user interface 400 may always include a possible position node of "flat" with no edges shown which allows a trader to be able to always quickly go to a flat position. In certain embodiments, multiple edges may be shown between two particular position nodes. For example, multiple edges may be shown between a current node and a possible position node representing different ways a conversion may be made, such as buying/selling each of the individual underlying tradeable objects, buying/selling an exchange-listed spread, or other combinations. As another example, multiple edges may be shown where each edge corresponds to a different quantity for the resulting conversion.

In certain embodiments, more than one level of possible position nodes may be shown in the user interface 400. For example, while the example shown in the user interface 400 only includes possible position nodes for one level of conversions (that is, positions that are directly achievable from the current position), in other embodiments, possible position nodes for "n" levels of conversions could be shown.

In operation, as an example, if a trader wants to go from the current flat position (node 410) to sell the A-B spread, node 421 and/or edge 431 may be selected to convert the flat position to the short A, long B position represented by node 421. The graph-based strategy trading tool may then initiate one or more orders to achieve the possible position. For example, the tool may send an order to sell A and an order to buy B. As another example, a single order for an exchange-listed spread may be placed, if available at the exchange. The orders may be, for example, limit orders at a particular price or market orders. In certain embodiments, quantities are preconfigured. For example, by default, a quantity of one unit of the trading strategy corresponding to a particular edge/node may be used to determine the respective quantities of the associated tradeable objects. In certain embodiments, a desired quantity is received from the user. For example, the interface 400 may include controls for specifying a quantity and/or the interface 400 may prompt the user for a quantity. As another example, a user may left-click on a node or edge to utilize a default quantity (such as 1 unit of the associated spread) and the user may right-click on a node or edge to be prompted to specify a different quantity to use.

Subsequent to selecting a new desired position, the user interface 400 is updated to reflect the new current position and the new possible positions.

Figure 5:
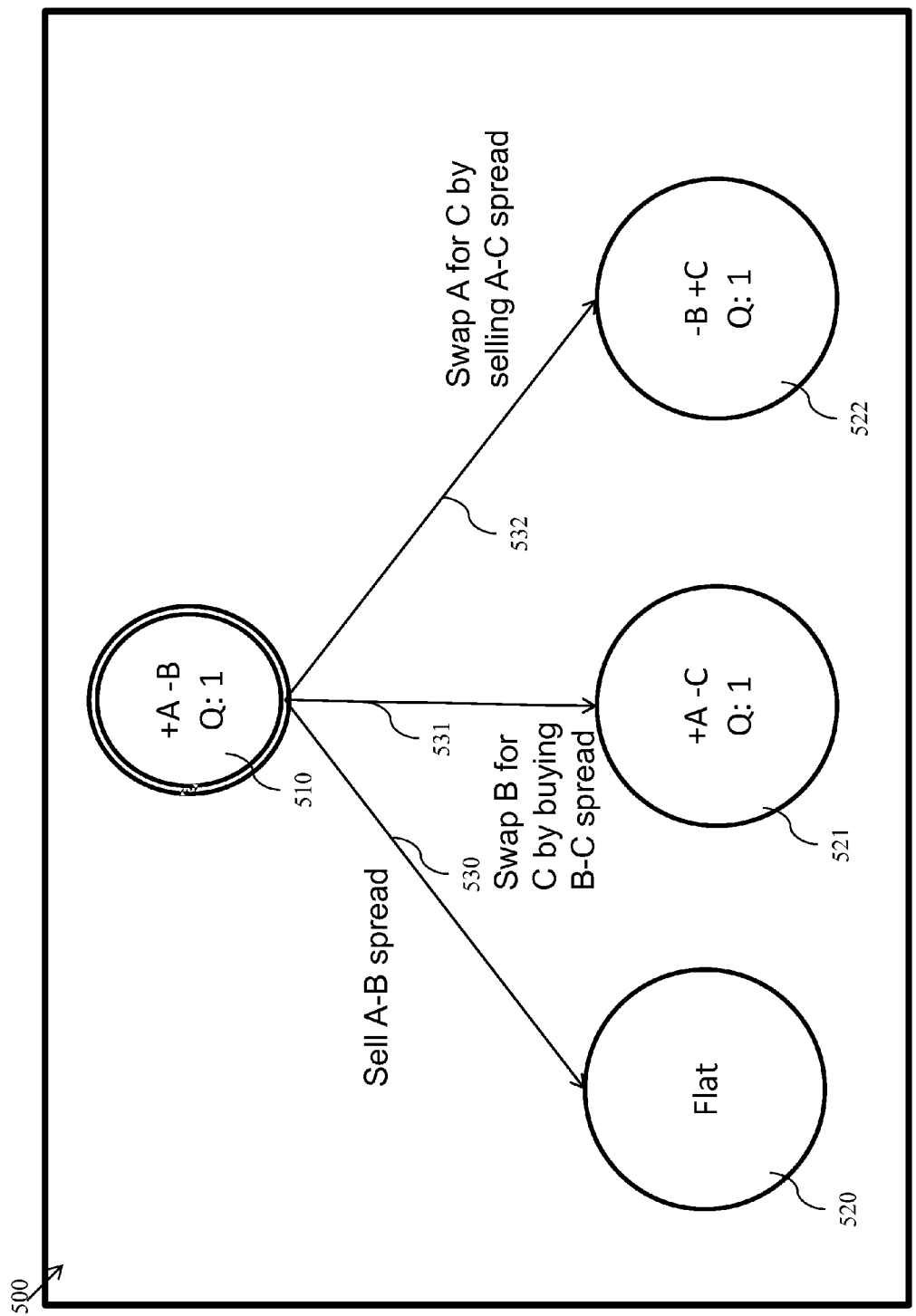
FIG. 5 illustrates an example user interface for a graph-based strategy trading tool according to certain embodiments.

FIG. 5 illustrates an example user interface 500 for a graph-based strategy trading tool according to certain embodiments. As illustrated in the user interface 500, the current position is represented by node 510. The current position node 510 shows the current position is long A, short B (long the A-B spread) with a spread quantity of 1. As an example, if the A-B spread has a spread ratio of 1-1, the trader's position would be long A with a quantity of 1 and short B with a quantity of 1. As another example, if the A-B spread has a spread ratio of 2-3, the trader's position would be long A with a quantity of 2 and short B with a quantity of 3 (and the spread position would be long 1).

Nodes 520-522 represent possible positions that the current position may be converted to. Node 520 would take the trader from the current position to a flat position. To achieve this position, the tool may sell A and buy B (selling the A-B spread). As an example, if the A-B spread has a spread ratio of 2-3 and the current position is long 1 of the A-B spread, the tool may place an order to sell A with a quantity of 2 and buy B with a quantity of 3. Node 521 would take the trader from the current position to long A, short C (long the A-C spread) with a spread quantity of 1. To achieve this position, the tool may buy B and sell C (buying the B-C spread), effectively swapping short B for short C, to convert the current position from long the A-B spread to long the A-C spread. As an example, if the A-B spread has a spread ratio of 2-3 and the current position is long 1 of the A-B spread and the A-C spread has a spread ratio of 2-5, the tool may place an order to buy B with a quantity of 3 and sell C with a quantity of 5. Node 522 would take the trader from the current position to short B, long C (short the B-C spread). To achieve this position, the tool may sell A and buy C (selling the A-C spread), effectively swapping long A for long C, to convert the current position from long the A-B spread to short the B-C spread. As an example, if the A-B spread has a spread ratio of 2-3 and the current position is long 1 of the A-B spread and the B-C spread has a spread ratio of 3-5, the tool may place an order to sell A with a quantity of 2 and buy C with a quantity of 5.

In certain embodiments, the current position node 510 may be selected to add to the trader's current position. For example, if the current position was long the A-B spread with a quantity of 1, then selecting the current position node 510 may place order(s) to increase the spread position from a quantity of 1 to a quantity of 2. As an example, if the A-B spread has a spread ratio of 2-3 and the current position is long 1 of the A-B spread, when the current position node 510 is selected, the tool may place an order to buy A with a quantity of 2 and sell B with a quantity of 3, resulting in a total position of long 4 A and short 6 B, which is a position of long 2 in the A-B spread. In certain embodiments, possible position nodes to decrease the current quantity position may be provided by the tool. In certain embodiments, selecting the current position node with different types of selection (for example, left-click versus right click or left-click versus shift-left-click) may increase or decrease the current position quantity.

Figure 6:
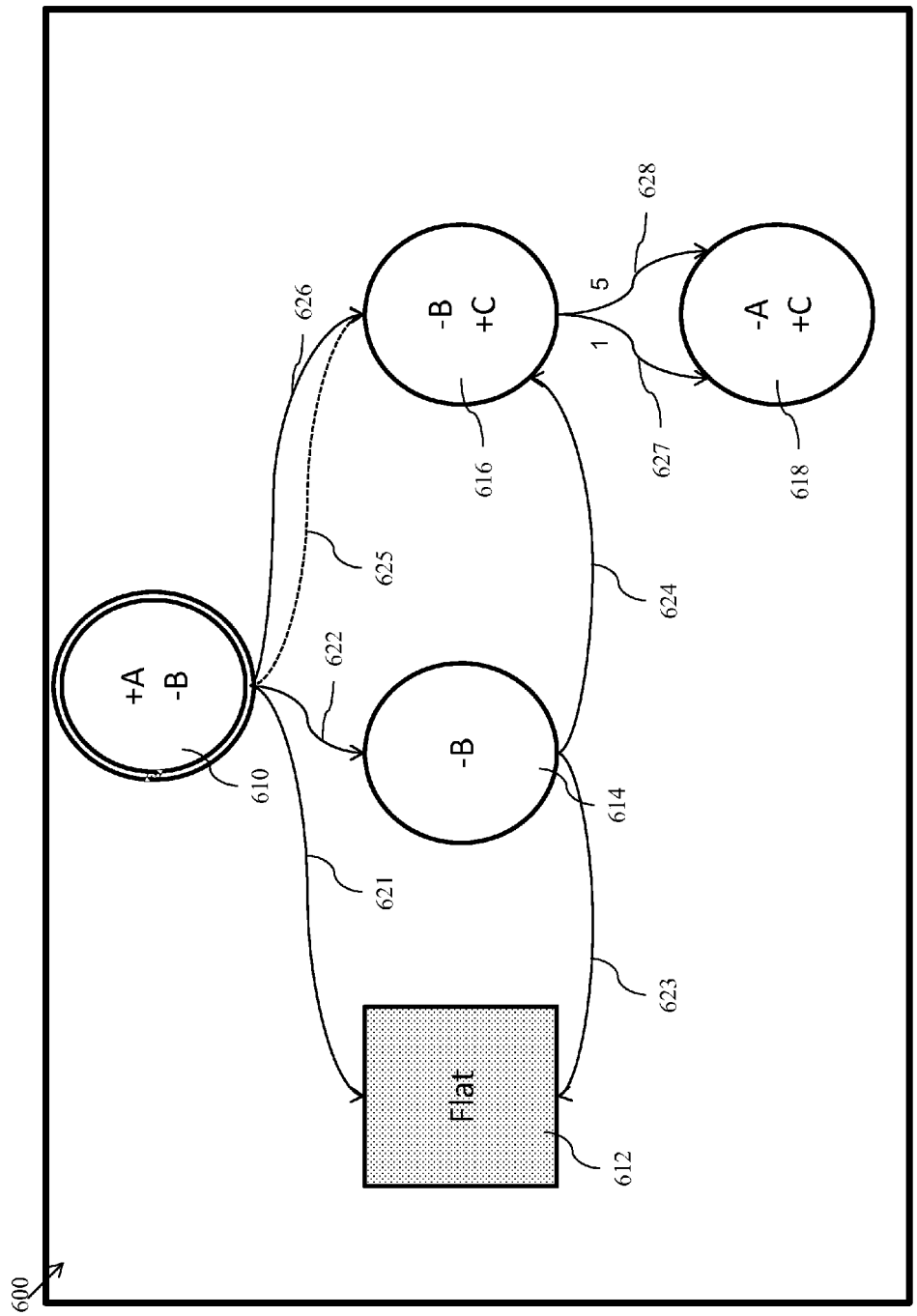
FIG. 6 illustrates an example user interface for a graph-based strategy trading tool according to certain embodiments.

FIG. 6 illustrates an example user interface 600 for a graph-based strategy trading tool according to certain embodiments. As illustrated in the user interface 600, the current position is represented by node 610 and nodes 612-618 represent possible positions. Edges 621-628 represent transitions between the nodes.

The current position node 610 shows the current position is long the A-B spread (long A, short B). The current position node 610 is distinguished from other nodes by having a different drawing style (double border).

Node 612 represents the flat position and is distinguished by being a different shape (square) and color (shaded). The transition from the current position node 610 to the flat position represented by node 612 is represented by edge 621. To achieve this transition, the tool may sell the A-B spread.

Node 614 represents a position of short B and does not correspond to a spread position. The transition from the current position node 610 to the short B position represented by node 614 is represented by edge 622. To achieve this transition, the tool may sell A. The transition from the short B position represented by node 614 to the flat position (node 612) is represented by edge 623. To achieve this transition, the tool may buy B. Edge 621 and edges 622-623 provide two conversion paths to transition from the current position to the flat position. Edge 621 involves a single level of conversion whereas edges 622-623 involve two levels of conversion. Thus, node 612 is both at the first level of conversion and the second level of conversion (but with potentially different costs). The transition from the short B position represented by node 614 to the short B-C spread position (node 616) is represented by edge 624. To achieve this transition, the tool may buy C. Edge 624 is also part of a second level of conversion to achieve the short B-C spread position.

Edges 625 and 626 represent first level conversions from the current position node 610 to the short B-C spread position (node 616). Edge 625 is shown in a dashed line style distinguishing it from the solid line style of edge 626. The differing line styles may indicate different actions for achieving the conversion between the nodes. For example, the dashed line style of edge 625 may represent that a synthetic spread is traded to achieve the conversion. In this case, tradeable object A may be sold and tradeable object C may be bought to achieve the conversion. As another example, the solid line style of edge 626 may represent that an exchange-listed spread is traded to achieve the conversion. In this case, the exchange-listed A-C spread tradeable object may be sold to achieve the conversion.

Node 618 represents a position of short the A-C spread and is a second level node because in this example a minimum of two conversions are needed to achieve the short A-C spread position from the current position of long the A-B spread. Edges 627 and 628 represent conversions from the short B-C spread position (node 616) to the short A-C spread position (node 618). Edges 627 and 628 are labeled with the quantity to achieve in transitioning to the short A-C spread position (node 618). Edge 627 is labeled to indicate that a quantity of 1 in the short A-C spread position is to be achieved. Edge 628 is labeled to indicate that a quantity of 5 in the short A-C spread position is to be achieved.

Figure 7:
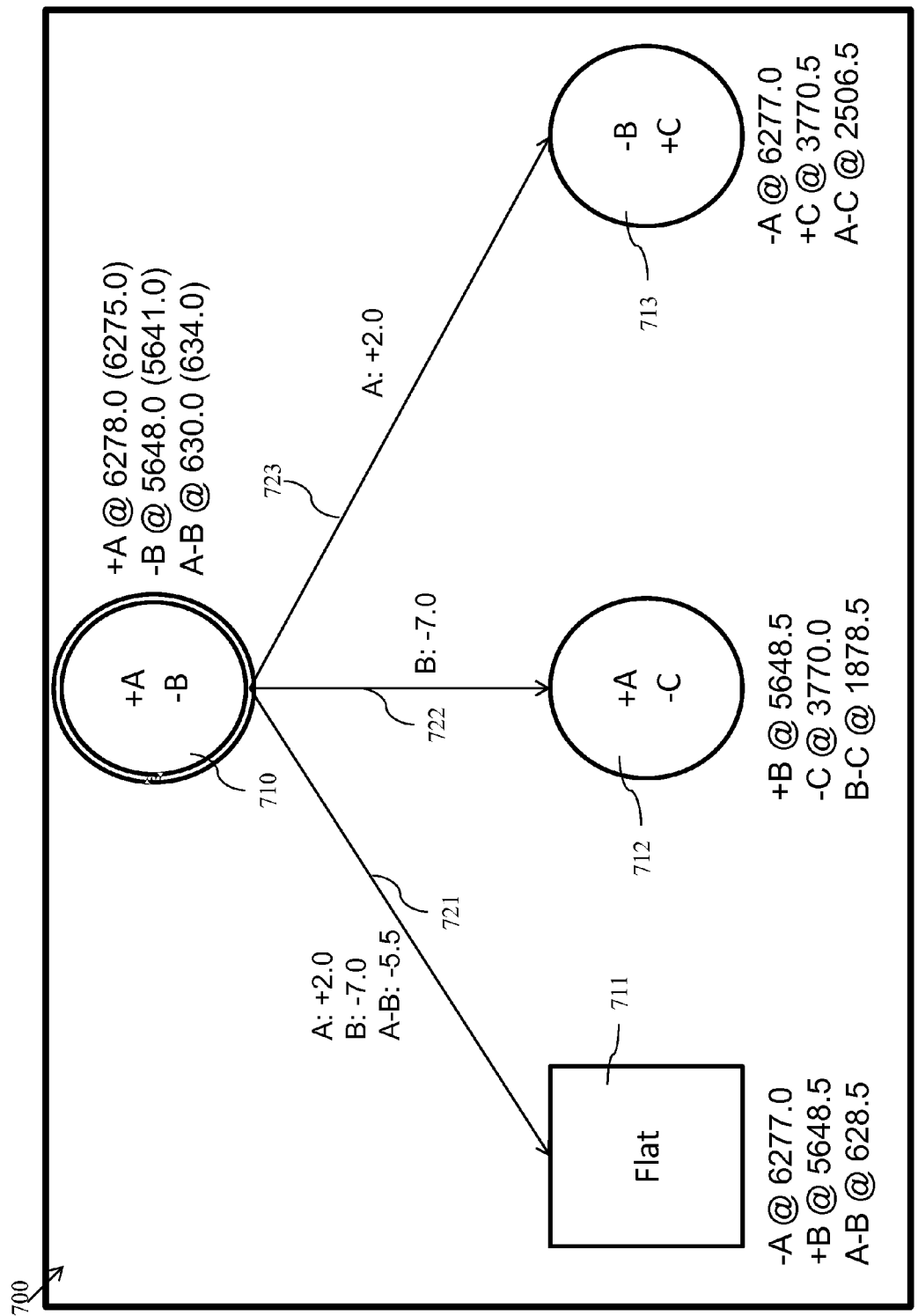
FIG. 7 illustrates an example user interface for a graph-based strategy trading tool according to certain embodiments.

FIG. 7 illustrates an example user interface 700 for a graph-based strategy trading tool according to certain embodiments. As illustrated in the user interface 700, the current position is represented by node 710 and nodes 711-713 represent possible positions. Edges 721-723 represent transitions between the nodes.

The current position node 710 shows the current position is long the A-B spread (long A, short B). The current position node 710 is distinguished from other nodes by having a different drawing style (double border) than the possible position nodes 711-713. In this example embodiment, edges 721-723 include an arrow indicating direction.

From the current position represented by node 710, several possible positions are represented by nodes 711-713. Node 711 represents a possible position of flat, which may be achieved by selling the A-B spread. Node 712 represents a possible position of long the A-C spread, which may be achieved by converting the short B position into a short C position by buying the B-C spread. Node 713 represents a possible position of short the B-C spread, which may be achieved by converting the long A position into a long C position by selling the A-C spread.

In the example illustrated in FIG. 7, tradeable objects A, B, and C may be initially associated with bid and ask prices as follows:

TABLE 1

| Tradeable Object | Bid | Ask |
|---|---|---|
| A | 6274.0 | 6275.0 |
| B | 5641.0 | 5641.5 |
| C | 3765.0 | 3765.5 |

Assuming each spread has a ratio of 1-1 and given the pricing associated with A, B, and C in Table 1, available two-legged spreads may be priced as follows:

TABLE 2

| Spread | Bid | Ask |
|---|---|---|
| A-B | 6274.0 − 5641.5 = 632.5 | 6275.0 − 5641.0 = 634.0 |
| A-C | 6274.0 − 3765.5 = 2508.5 | 6275.0 − 3765.0 = 2510.0 |
| B-C | 5641.0 − 3765.5 = 1875.5 | 5641.5 − 3765.0 = 1876.5 |

For this example, assume that the graph-based strategy trading tool has been configured to use market orders to obtain positions in synthetic spreads. Thus, for example, to sell the B-C spread, the tool would place a market order to sell B (which should be filled at the best bid price for B) and place a market order to buy C (which should be filled at the best ask price for C). In this example, at the time that the market is at the prices represented in Tables 1 and 2, the trader decides to buy the A-B spread with a quantity of 1 and achieves this position after buying a quantity of 1 of A at the best ask price (6275.0) and selling a quantity of 1 of B at the best bid price (5641.0). This is equivalent to buying the A-B spread at the best ask price for the A-B spread shown in Table 2 (634.0).

Sometime after the long A-B position was achieved, assume the market changes, as shown in the tables below (for this example, A, B, and C have a tick size (minimum price change increment) of 0.5):

TABLE 3

| Tradeable Object | Change | New Bid | New Ask |
|---|---|---|---|
| A | +6 ticks | 6277.0 | 6278.0 |
| B | +14 ticks | 5648.0 | 5648.5 |
| C | +10 ticks | 3770.0 | 3770.5 |

This change in price results in the following bid and ask prices for the spreads in the example:

TABLE 4

| Spread | Bid | Ask |
|---|---|---|
| A-B | 6277.0 − 5648.5 = 628.5 | 6278.0 − 5648.0 = 630.0 |
| A-C | 6277.0 − 3770.5 = 2506.5 | 6278.0 − 3770.0 = 2508.0 |
| B-C | 5648.0 − 3770.5 = 1877.5 | 5648.5 − 3770.0 = 1878.5 |

Continuing the above example, as illustrated in FIG. 7 and using the example data from Tables 3 and 4, the trader's current position (long the A-B spread) is represented in node 710. Next to the current position node 710 is an indicator representing what it would cost to add to the current position. Here, this would be the cost to add to the long A-B spread position, which means buying more of the A-B spread (buying A and selling B). In this example, at the current market prices represented in Tables 3 and 4, A would be bought at the best ask price of 6278.0 and B would be sold at the best bid price of 5648.0 (which is the equivalent to buying the A-B spread at the best ask price of 630.0). In addition, in this example, the price that the tradeable objects and spread of the current position were acquired is shown in parentheses in the indicator next to the current position node. In certain embodiments, the basis information may be shown instead of or in addition to the prices to add to the current position.

Possible position nodes 711-713 represent several conversion options available to the trader. For example, the user can go flat by selecting node 711 or edge 721. Under the possible position node 711 is an indicator representing the costs associated with converting to the position represented by node 711. Here, this would be the cost to sell the A-B spread (sell A at the best bid price of 6277.0 and buy B at the best ask price of 5648.5 (equivalent to selling the A-B spread at the best bid price of 628.5)), thereby gaining 2.0 on A and losing 7.5 on B (losing 5.5 on the A-B spread). An indicator representing the P/L effect associated with converting to the position represented by node 711 is shown next to edge 721.

As another example, the user can convert to long the A-C spread by selecting node 712 or edge 722. Under the possible position node 712 is an indicator representing the costs associated with converting to the position represented by node 712. Here, this would be the cost to buy the B-C spread (buy B at the best ask price of 5648.5 and sell C at the best bid price of 3770.0 (equivalent to buying the B-C spread at the best ask price of 1878.5)), thereby losing 7.0 on B. An indicator representing the P/L effect associated with converting to the position represented by node 712 is shown next to edge 722.

As another example, the user can convert to short the B-C spread by selecting node 713 or edge 723. Under the possible position node 713 is an indicator representing the costs associated with converting to the position represented by node 713. Here, this would be the cost to sell the A-C spread (sell A at the best bid price of 6277.0 and buy C at the best ask price of 3770.5 (equivalent to selling the A-C spread at the best bid price of 2506.5)), thereby gaining 2.0 on A. An indicator representing the P/L effect associated with converting to the position represented by node 713 is shown next to edge 723.

In certain embodiments, additional information may be provided with respect to one more nodes in a graph-based trading interface. For example, at a flat position, information such as a net realized profit and loss and/or net unrealized profit and loss may be shown. At a current position node, information such as a basis in the position and legs (price at which the trader acquired the position) and/or current position quantity may be shown, for example. At a potential position node, information such as a current gain/loss of each leg if the trader were to exit that position, an estimated basis in the spread based on current market prices of the legs if the trader entered that position, a current price(s) of the instruments, and/or a potential position may be shown. Edges connecting nodes may show information such as a spread to be executed, leg risk, spread price, whether the conversion uses an exchange traded or synthetically traded spread, broker(s) to be used, and/or trading connection to be used, for example.

Figure 8:
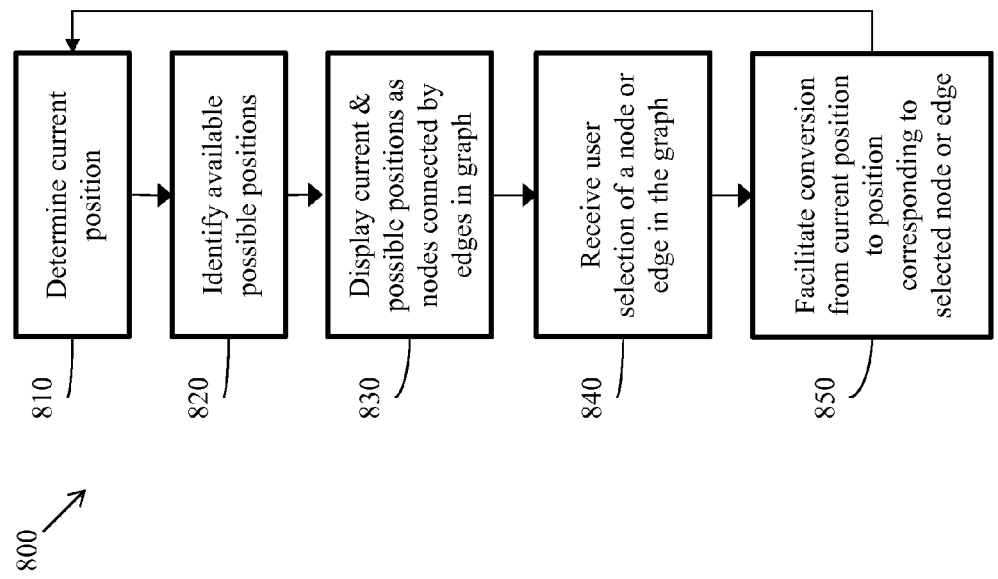
FIG. 8 depicts a flow diagram of an example method for trading according to an embodiment of a graph-based strategy trading tool.

FIG. 8 illustrates a flow diagram 800 of an example method for trading according to an embodiment of a graph-based strategy trading tool.

At block 810, information regarding a current position is determined. For example, a current position (for example, a position of long the A-B spread) may be determined based on trader data. As another example, the current position may be determined based on input from a trader. The current position may be tracked by a trading application incorporating a graph-based strategy trading tool based on placed trades and/or received fill confirmations, for example.

At block 820, available possible positions for converting to are identified. For example, possible positions (for example, flat, long the A-C spread, short the B-C spread, etc.) to which a trader can convert the current position determined at block 810 (for example, long the A-B spread) are identified based on market data and configurations specified by the trader. To identify the possible positions, one or more trades may be hypothetically applied to the current position may be used. These hypothetically applied trades may be associated with the possible position for use in facilitating a transition to the possible position. The available positions may be identified recursively. For example, starting from the current position, a set of possible positions that can be directly converted to is determined, such as by iterating through all possible combinations for the set of tradeable objects being used. Next, for each of the determined possible positions, additional possible positions are recursively determined, treating each determined possible position as a starting position. This recursion may be repeated one or more times depending on the desired number of levels to be displayed by the graph-based strategy trading tool, for example. As another example, the recursion may be repeated until no new possible positions are identified, resulting in the set of all hypothetical possible positions based on the set of tradable objects being used.

After a possible position has been identified, the prices associated with converting to that position may be determined. These prices may include the prices to buy or sell, as appropriate, the underlying tradeable objects and/or the strategy itself as well as associated P/L effects from converting to the possible position, for example.

At block 830, the current and possible positions determined in blocks 810 and 820 are displayed as nodes connected by edges on a selectable graph-based strategy trading tool interface. The display of the current and possible position nodes and edges may be similar to those discussed above for example.

At block 840, a command from a user selecting a node or edge in the graph-based strategy trading tool interface is received. For example, a user may select a node or edge in the graph associated with a different position, as discussed above for example.

At block 850, conversion from the current position to the position corresponding to the selected node or edge is facilitated by the graph-based strategy trading tool. In response to the user's selection at block 840, the graph-based strategy trading tool may initiate placement of one or more orders to convert from the current position to the position associated with the selected node, as discussed above for example. For example, when a node representing a possible position is selected, the graph-based strategy trading tool facilitates one or more trades to achieve the selected possible position. In certain embodiments, when an edge is selected, the graph-based strategy trading tool facilitates one or more trades to achieve a possible position associated with a possible position node associated with the selected edge. The trade(s) to be placed to achieve the possible position may be determined when the possible position was identified at block 820, for example.

After the trader's current position has changed, control returns to block 810.

Figure 9:
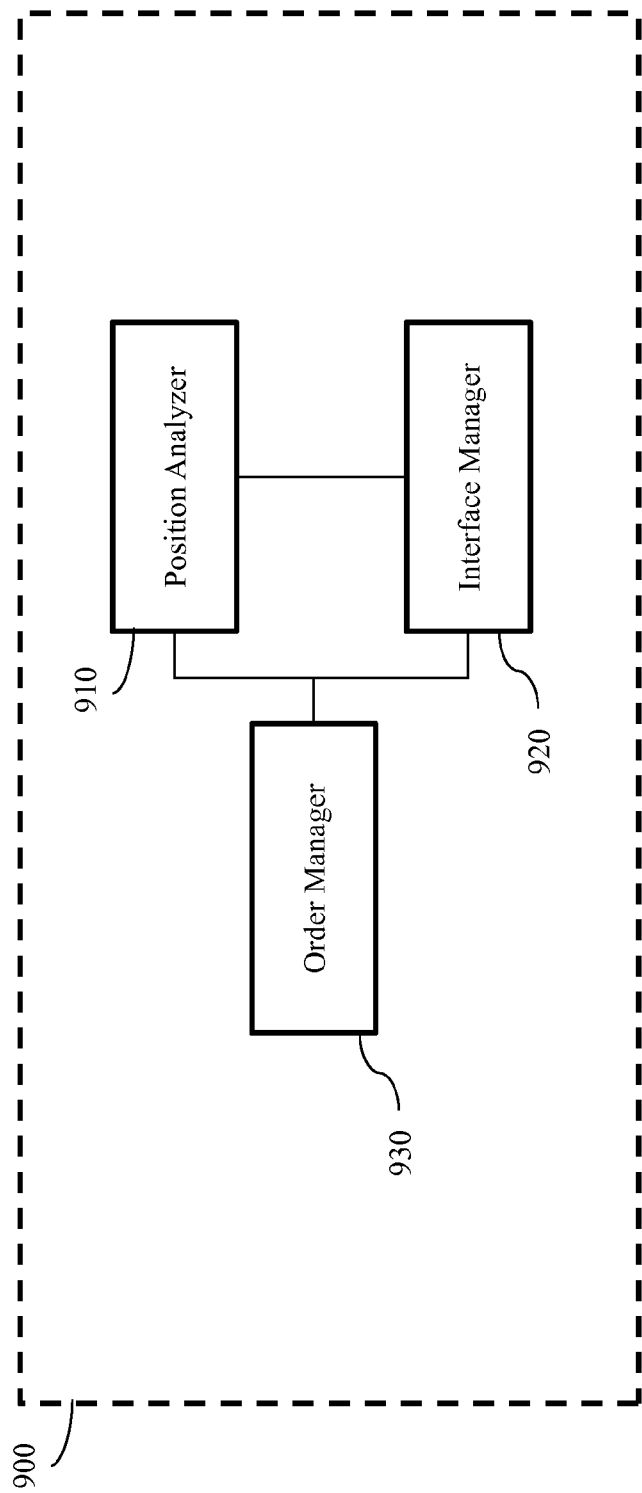
FIG. 9 illustrates a block diagram of an example trading device in accordance with certain embodiments.

FIG. 9 illustrates a block diagram of an example trading device 900 in accordance with certain embodiments. The trading device 900 may be similar to the trading device 110 discussed above, for example. The trading device 900 includes a position analyzer 910, an interface manager 920, and an order manager 930. The trading device 900 executes the position analyzer 910, the interface manager 920, and the order manager 920 to provide a graph-based strategy trading tool that facilitates strategy trading and conversion from one position to another (for example, conversion between one spread position and another spread position) through display of positions as nodes in a graph connected by edges and processing of orders. Nodes and/or edges of the displayed graph are available for user selection.

The position analyzer 910 determines a current position. For example, a current position (for example, a position of long the A-B spread) may be determined based on trader data, such as previously consummated trades. As another example, the current position may be determined based on input from a trader. The current position may be tracked by the position analyzer 910 and/or the order manager 930 based on placed trades and/or received fill confirmations, for example.

In addition, the position analyzer 910 identifies available possible positions for converting to. For example, possible positions (for example, flat, long the A-C spread, short the B-C spread, etc.) to which a trader can convert the determined current position (for example, long the A-B spread) to are identified based on market data and configurations specified by the trader.

The position analyzer 910 provides the current position and available possible positions to the interface manager 920. When the current position and/or available possible positions change, updated information is provide to the interface manager 920. The current position and/or the available possible positions may be determined or updated based on market data received from the order manager 930, for example.

In certain embodiments, the position analyzer 910 also determines and provides to the interface manager 920 information about actions to be taken to convert from one position to another, P/L information associated with such conversions, and/or other information about the current position and the available possible positions. This information may be determined based on data provide by the order manager 930, for example.

The interface manager 920 generates a graphical user interface that includes a graph with nodes corresponding to the current position and the available possible positions provided by the position analyzer 910. The display of the current and possible position nodes and edges may be similar to those discussed above for example. In certain embodiments, additional information provided by the position analyzer 910 is displayed in association with nodes and/or edges of the displayed graph. The interface manager 920 may also provide indicators on the graphical user interface based on information provided by the order manager 930, such as pricing information for tradeable objects associated with the displayed positions.

The interface manager 920 is configured to receive a command from a user selecting a node or edge in the displayed graph. For example, a user may select a node or edge in the graph associated with a different position, as discussed above for example. In response to receiving the selection command corresponding to a new desired position, the interface manager 920 may communicate information about the new desired position to the position analyzer 910 and/or the order manager 930. For example, if a possible position node is selected, the interface manager 920 may provide the desired position associated with the selected possible position node to the position analyzer 910. The position analyzer 910 may then determine the trade(s) to be placed to convert from the current position to the desired position and provide information about those trade(s) to the order manager 930 to initiate them. As another example, the interface manager 920 may provide the desired position to the order manager 930 which may then generate the trade(s) to convert from the current position to the desired position.

The interface manager 920 updates the displayed graph based on updated information received from the position analyzer 910 and/or the order manager 930, such as when the current position changes or new market data is received.

The order manager 930 sends messages to place orders to effect a conversion from one position to another position based on information determined by the position analyzer 910 and the interface manager 920. The messages may be sent to an exchange similar to exchange 130 discussed above, for example. For example, the position analyzer 910 may provide to the order manager 930 parameters for trade orders to be placed to achieve a conversion from a current position to a possible position selected in the through the interface manager 920. As another example, the interface manager 920 may provide a desired position to the order manager 930 and the order manager 930 may then determine what trade(s) are necessary to achieve the desired position from the current position.

In addition, the order manager 930 provides information about changes in position as a result of these orders to the position analyzer 910. The changes may be determined based on fill confirmations received by the order manager 930, for example.

The order manager 930 may receive market data from an exchange and provide it to the position analyzer 910 and/or the interface manager 920, for example. For example, updated pricing information for tradeable objects associated with positions determined by the position analyzer 920 may be provided so that new P/L information may be determined and/or displayed.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:
    determining by a computing device a current position for a trader in a plurality of tradeable objects;
    determining by the computing device a plurality of possible positions based on the current position and the plurality of tradeable objects, wherein each possible position represents a position in one or more of the tradeable objects that is different from the current position;
    displaying by a computing device in a graphical user interface a directed graph, wherein the directed graph includes a current position node, a plurality of possible position nodes, and a plurality of edges, wherein the current position node corresponds to the current position for the trader, wherein each possible position node corresponds to one of the determined plurality of possible positions, wherein each of the plurality of edges links from the current position node to one of the plurality of possible position nodes;
    receiving by the computing device a command selecting an object in the directed graph, wherein the object is one of a node and an edge;
    determining by the computing device a desired position associated with the selected object; and
    initiating by the computing device placement of at least one order to convert the current position to the desired position.

2. The method of claim 1, further including:
    updating by the computing device the displayed directed graph to reflect a new current position as a result of the at least one order.

3. The method of claim 1, wherein one of the plurality of possible positions is a flat position.

4. The method of claim 1, wherein the current position node is one of: (1) in the center of the directed graph and (2) in a pre-determined position in the directed graph.

5. The method of claim 1, wherein the directed graph includes an indicator representing a basis in the current position.

6. The method of claim 1, wherein the directed graph includes at least one of the group consisting of: (1) an indicator representing a profit and loss value associated with one of the plurality of possible position nodes and (2) an indicator representing current pricing information associated with one of the plurality of possible position nodes.

7. The method of claim 1, wherein the plurality of possible positions includes positions that require more than one conversion from the current position to reach.

8. A non-transitory computer readable medium having stored therein instructions executable by a processor, including instructions executable to:
    determine a current position for a trader in a plurality of tradeable objects;
    determine a plurality of possible positions based on the current position and the plurality of tradeable objects, wherein each possible position represents a position in one or more of the tradeable objects that is different from the current position;
    display in a graphical user interface a directed graph, wherein the directed graph includes a current position node, a plurality of possible position nodes, and a plurality of edges, wherein the current position node corresponds to the current position for the trader, wherein each possible position node corresponds to one of the determined plurality of possible positions, wherein each of the plurality of edges links from the current position node to one of the plurality of possible position nodes;
    receive a command selecting an object in the directed graph, wherein the object is one of a node and an edge;
    determine a desired position associated with the selected object; and
    initiate placement of at least one order to convert the current position to the desired position.

9. The computer readable medium of claim 8, further including instructions executable to:
    update the displayed directed graph to reflect a new current position as a result of the at least one order.

10. The computer readable medium of claim 8, wherein one of the plurality of possible positions is a flat position.

11. The computer readable medium of claim 8, wherein the current position node is one of: (1) in the center of the directed graph and (2) in a pre-determined position in the directed graph.

12. The computer readable medium of claim 8, wherein the directed graph includes an indicator representing a basis in the current position.

13. The computer readable medium of claim 8, wherein the directed graph includes at least one of the group consisting of: (1) an indicator representing a profit and loss value associated with one of the plurality of possible position nodes and (2) an indicator representing current pricing information associated with one of the plurality of possible position nodes.

14. The computer readable medium of claim 8, wherein the plurality of possible positions includes positions that require more than one conversion from the current position to reach.

15. A system including:
    a computing device,
    wherein the computing device is configured to determine a current position for a trader in a plurality of tradeable objects;
    wherein the computing device is configured to determine a plurality of possible positions based on the current position and the plurality of tradeable objects, wherein each possible position represents a position in one or more of the tradeable objects that is different from the current position;
    wherein the computing device is configured to display in a graphical user interface a directed graph, wherein the directed graph includes a current position node, a plurality of possible position nodes, and a plurality of edges, wherein the current position node corresponds to the current position for the trader, wherein each possible position node corresponds to one of the determined plurality of possible positions, wherein each of the plurality of edges links from the current position node to one of the plurality of possible position nodes;
    wherein the computing device is configured to receive a command selecting an object in the directed graph, wherein the object is one of a node and an edge;
    wherein the computing device is configured to determine a desired position associated with the selected object; and
    wherein the computing device is configured to initiate placement of at least one order to convert the current position to the desired position.

16. The system of claim 15,
wherein the computing device is configured to update the displayed directed graph to reflect a new current position as a result of the at least one order.

17. The system of claim 15, wherein one of the plurality of possible positions is a flat position.

18. The system of claim 15, wherein the current position node is one of: (1) in the center of the directed graph and (2) in a pre-determined position in the directed graph.

19. The system of claim 15, wherein the directed graph includes an indicator representing a basis in the current position.

20. The system of claim 15, wherein the directed graph includes at least one of the group consisting of: (1) an indicator representing a profit and loss value associated with one of the plurality of possible position nodes and (2) an indicator representing current pricing information associated with one of the plurality of possible position nodes.

21. The system of claim 15, wherein the plurality of possible positions includes positions that require more than one conversion from the current position to reach.

* * * * *